United States Patent
Hu et al.

(10) Patent No.: US 7,235,608 B2
(45) Date of Patent: Jun. 26, 2007

(54) REMOISTENABLE PRE-APPLIED ADHESIVE

(75) Inventors: Yuhong Hu, Belle Mead, NJ (US); Tianijian Huang, Hillsborough, NJ (US); Paul M. Petersen, Princeton, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 398 days.

(21) Appl. No.: 10/205,137

(22) Filed: Jul. 25, 2002

(65) Prior Publication Data
US 2004/0018332 A1    Jan. 29, 2004

(51) Int. Cl.
*C08L 33/04* (2006.01)
*C08L 33/24* (2006.01)
*C08L 35/02* (2006.01)

(52) U.S. Cl. .................... 525/218; 525/222

(58) Field of Classification Search ............ 525/191, 525/218, 222; 159/60, 325, 326, 330.9, 331.2; 524/13
See application file for complete search history.

(56) References Cited

U.S. PATENT DOCUMENTS

| | | | |
|---|---|---|---|
| 3,257,225 A * | 6/1966 | Marotta et al. | 427/202 |
| 3,902,293 A | 9/1975 | Witt et al. | |
| 4,474,915 A | 10/1984 | Grinacoff | |
| 4,678,824 A | 7/1987 | Lauria | |
| 4,719,264 A | 1/1988 | Lotz, Jr. | |
| 4,731,140 A | 3/1988 | Yontrarak | |
| 4,910,048 A | 3/1990 | Sinclair | |
| 5,296,535 A | 3/1994 | Nesiewicz et al. | |
| 5,543,455 A | 8/1996 | Shah | |
| RE36,177 E | 4/1999 | Rouyer et al. | |
| 5,965,646 A | 10/1999 | Norby | |
| 6,169,132 B1 | 1/2001 | Fickeisen et al. | |
| D442,296 S | 5/2001 | Külik | |
| D442,298 S | 5/2001 | Külik | |
| D442,706 S | 5/2001 | Külik | |
| D442,707 S | 5/2001 | Külik | |
| 6,794,001 B2 * | 9/2004 | Chen et al. | 428/40.1 |

FOREIGN PATENT DOCUMENTS

WO    WO 98/58142    12/1998

* cited by examiner

*Primary Examiner*—Nathan M. Nutter
(74) *Attorney, Agent, or Firm*—Cynthia L. Foulke

(57) ABSTRACT

A pre-applied, remoistenable adhesive useful in bonding wood substrates together.

9 Claims, No Drawings

REMOISTENABLE PRE-APPLIED ADHESIVE

FIELD OF THE INVENTION

The invention relates to adhesives, in particular remoistenable adhesives that may be pre-applied onto a wood substrate and later reactivated with water to bond the wood substrate to a second substrate.

BACKGROUNG OF THE INVENTION

Adhesives that may be applied to a substrate and then later reactivated (e.g., by pressure, moisture, and/or heat) to bond the substrate to a second chosen substrate provides a number of advantages. One major advantage is that the end user of the adhesive does not need to devote time and resources to adhesive related issues such as selection, processing, trouble shooting, application, clean-up, inventory and the like.

Water remoistenable adhesives are dry adhesive compositions which, when moistened with water, develop an adhesive tackiness. Water remoistenable pre-applied adhesives are known and practiced in the art. Such adhesives are conventionally used on postage stamps, wallpaper, tapes, labels, envelope flaps and the like. Water remoistenable adhesive compositions are described, for example, in U.S. Pat. Nos. 4,678,824, 4,719,264, 4,910,048 and 5,296,535.

While water remoistenable adhesives have long been used, prior art water remoistenable adhesives lack adequate bond strength for use in the flooring and furniture industries. A need exists in the art for a water remoistenable adhesive that can be pre-applied to porous materials such as wood and wood composites and, following activation, has sufficient adhesion force to bond these types of materials together. The current invention addresses this need.

SUMMARY OF THE INVENTION

The invention provides adhesives that may be preapplied to a substrate, in particular a wood substrate, and, when ready to use, reactivated upon exposure to moisture. The activatable adhesives of the invention may advantageously be used in tongue and groove applications and in furniture assembling applications including self-assembled furniture applications.

One aspect of the invention is directed to an adhesive preapplied to a wood substrate which adhesive upon exposure to moisture is capable of bonding the wood substrate to a second substrate. Preferable the second substrate is also wood. A preferred adhesive of the invention comprises a crosslinkable polymer and a crosslinking agent. In one embodiment the adhesive comprises a crosslinkable polymer, a water-soluble polymer and a crosslinking agent.

One particularly preferred embodiment of the invention is directed to a two-component reactivatable adhesive system wherein one component comprises a crosslinkable polymer and a second component comprises a crosslinking agent. Preferably, one component of the reactivatable adhesive system comprises a crosslinkable acetate polymer and a water-soluble polymer and the second component comprises a water soluble polymer and a crosslinking agent. In the practice of the invention at least one of said components is applied to a wood substrate. In a preferred method of practicing the invention one component is present on a first wood substrate to be bonded to a second substrate and the second component is present on a second wood substrate to be bonded to a first wood substrate.

Yet another aspect of the invention is directed to a process for bonding at least a first wood substrate to at least a second substrate, wherein at least a portion of at least one of said substrates has applied thereon an adhesive which upon exposure to moisture is capable of bonding the wood substrate to a second substrate. The adhesive may be applied to one or both of said first or second substrates. When a two component system is used to bond a first wood substrate to a second substrate, one component may be applied to the first substrate and the second component may be applied to the second substrate. Alternatively, both components may be applied to one or both substrate surfaces. In a preferred two component system, one component of the adhesive system comprises a crosslinkable acetate polymer and a water-soluble polymer and the second component comprises a non-crosslinkable acetate polymer, a water soluble polymer and a crosslinking agent. In the practice of the invention the adhesive component is applied to each substrate and allowed to dry. The process comprises exposing the applied dry adhesive present on said first and/or second substrate to moisture for a time sufficient to moisten the adhesive, bringing one of said substrates in contact with the moistened adhesive on the other substrate, and allowing the adhesive to dry thereby bonding the first substrate to the second substrate.

Still another aspect of the invention is directed to articles of manufacture comprising a water reactivatable adhesive that upon exposure to moisture is capable of bonding the wood substrate to a second substrate. The adhesive may be a one or two component adhesive. When articles are manufactured using a two component system one component is advantageously applied to one substrate to be bonded to a second substrate and the second component is advantageously applied to a second substrate to be bonded to a first substrate. Articles encompassed by the invention include but are not limited to tongue and groove panels for wall, ceiling and flooring applications and furniture component parts. A particularly preferred embodiment of the invention is tongue and groove panel, i.e., panels having interengaging tongues and grooves or planks wherein one adhesive component is applied to the tongue side of the plank and the second adhesive component is applied to the groove side of the plank.

Yet still another aspect of the invention is directed to a method of bonding one tongue and groove plank to a second tongue and groove plank, wherein one tongue and groove plank is bonded to a second tongue and groove plank, each of the planks to be bonded having an adhesive component preapplied to the tongue and/or groove surfaces thereof. The method comprises exposing the reactivatable adhesive components on the tongue and/or groove surfaces to moisture for a time sufficient to moisten the adhesive, bringing the tongue surface in contact with groove surface and, optionally, applying pressure to effect said bonding together.

DETAILED DESCRIPTION OF THE INVENTION

In contrast to prior art remoistenable adhesives used in conventional paper and label market, the current invention provides a remoistenable adhesive which renders sufficient bonding strength for bonding together substrates made of wood. It is to understood that term "wood" is being used generically and encompasses all types of wood as well as wood-containing composites, engineered wood, particle board and the like.

The invention relates to a pre-applied adhesive system that is activated by remoistening with water, yet producing a durable, water-resistant bond. The invention allows ease of installation and assembly for tongue-in-groove manufactured floor and wall materials (e.g., tongue and groove wainscotting) or furniture components, while providing sufficient bond strength and water-resistance.

The adhesive of the invention provides the art with an adhesive system that has good water resistance required by e.g., the wood paneling and furniture markets. Pre-application of the adhesive onto the substrates to be bonded has the further advantage that adhesive chemicals can be eliminated from the final manufacturer's/installer's inventory and/or facility and/or installation site, and provides uniformity in application which results in improved quality of the final product.

The invention provides a water remoistenable adhesive which, having been applied to a wood substrate and allowed to dry, is capable, upon reactivation with moisture, of bonding the wood substrate to a second substrate. Adhesives useful in the practice of the invention will generally exhibit greater than 50% wood tear, more typically greater than 75% wood tear, even more preferred for use are adhesives exhibiting complete substrate failure (100% wood tear) with no cohesive failure. The strength of the resulting bond will typically be greater than 30 pounds per linear inch (pli), more typically greater that 50 pli, and even more typically greater than 100 pli.

A particularly preferred embodiment of the invention are panels or planks made of a wood material having a tongue on at least one edge and a groove on at least one other edge fitting into the corresponding tongue and groove of further similar panels. Traditionally, wet adhesives are used for bonding tongue-in-groove type of joints, which gives good water resistance and bond strength. Conventionally when such panels are joined, glue is applied to the tongues of each panel before the tongues are inserted in the corresponding grooves of the adjacent panels. However, it is difficult to control the amount of glue applied within the joints. Too much glue yields excessive squeeze out and excessive swelling, and exacerbates clean-up. Problems like starved joint, poor water resistance and lifting occur when too little adhesive is used. Glue-less installation of planks that are designed to click together also poses problems in terms of weak water resistance and a high level of difficulty in the installation process.

The invention provides a pre-glued system that eliminates the need for the installer to use wet glue and eliminates common problems associated with the current process. The amount and the thickness of the glue is controlled by pre-applying the adhesive during the manufacturing process. Compared to a glueless installation, the pre-applied system provides for an easier installation process. In addition to facilitating installation, adhesives of the invention provide greater water resistance. The pre-applied remoistenable system of the invention also differs significantly from the conventional remoistenable adhesives for use on envelopes and labels. The adhesives of the invention provide strong bonding strength that is required for wood or laminate tongue and groove joints, which the conventional remoistenable adhesives cannot achieve.

The application of the adhesive onto a substrate for later activation or "reactivation" is referred to herein, and in the art as a "pre-applied" adhesive. The adhesive present on the substrate may be reactivated at any time after initial application to the substrate for bonding to a second substrate.

Reactivation, as this term is used herein, refers to an adhesive that resides on at least a portion of at least one substrate to be bonded to a second substrate. That is, the adhesive has been applied to a substrate in the liquid state and allowed to dry, i.e., solidify, thereon. The adhesive present on the first substrate is thereafter reactivated or remoistened back to a liquid state, by contacting the dry adhesive with moisture (e.g., water, steam or the like). The substrate is brought in contact with the second substrate and the adhesive allowed to dry or solidify, thereby bonding the two substrate together. The term remoistenable and reactivatable are used interchangeably though out this disclosure.

In the practice of the invention, adhesive present on at least one of the two substrates to be bonded together will be reactivated with water. If adhesive components are present on both substrates to be bonded together, the adhesive components on both substrates will preferably be reactivated with water. The amount of water to be used in the reactivation process will be an amount sufficient to at least partially re-emulsify the adhesive such that it is in a highly softened and tacky state.

The invention contemplates both one part and multi-part (e.g., 2 or more components) adhesive systems. The invention encompasses water remoistenable adhesives which, having been applied to a wood substrate, is capable, upon reactivation with moisture, of bonding the wood substrate to a second substrate. Particularly preferred is the use of the reactivated preapplied adhesive to bond one wood substrate to a second wood substrate.

The adhesives of the invention include adhesives that comprise a crosslinkable polymer and a crosslinking agent. In a preferred embodiment a crosslinkable polymer (e.g., a N-methylol acrylamide containing polymer) and a crosslinking catalyst (e.g., acid catalyst) is used. Alternatively, the crosslinkable polymer may be polymer containing functional groups containing reactive hydrogen moieties, such as —COOH. —OH and —NH$_2$, and the crosslinking agent may be a metal catalyst (e.g., a salt of titanium, aluminum, zinc, zirconium). A reactive hydrogen, as this term is conventionally used and understood in the art, means any hydrogen that can react with a Grignard reagent, see e.g., March, J., Advanced Organic Chemistry: reactions, mechanisms and structure, 4$^{th}$ edition, John Wiley & Sons, 1992, page 623. Based on the disclosure of the current invention, those of skill in the art would recognize other suitable crosslinkable polymers and crosslinking agents that can be used in the practice of the invention.

The invention will hereinafter be described in more detail in terms of a preferred two-part reactive (i.e., crosslinkable) adhesive system, each component part (referred to herein as component parts "A" and "B") being pre-applied onto respective substrates to be later bonded together. The component parts are reactivated by water, yielding a permanent structural or semi-structural bond between the substrates.

In one embodiment, adhesive component part A comprises a crosslinkable polymer. Adhesive component part B comprises a crosslinking agent. Adhesive component part A is applied to at least a portion of one substrate and allowed to dry. Adhesive component part B is applied to at least a portion of a second substrate, and allowed to dry. Alternatively, component part B may be applied to a portion or area of the first substrate that is separate and distinct from the area to which component part A was applied. This can easily be accomplished by, for example, screen printing adhesive component A to the substrate surface and then screen printing component B to the same substrate surface such that the components A and B are present on non-overlapping portions of the substrate. It is to be understood that component parts A and B may be present in a one components adhesive system comprising component part A and an encapsulated component part B (e.g., component part B is encapsulated in a water soluble membrane).

Both part A and part B adhesive compositions result in non-crosslinked pre-applied dry films before the bonding process is initiated. Once being remoistened by water and being mated together, a mixture of component part A and component part B will occur resulting in crosslinking of the component parts. When dry, the substrates are held together by a strong durable bond that has good water and heat resistance.

The resultant semi-structural or structural adhesive has been found to be useful for bonding porous substrates together, such as tongue and groove planks and furniture, etc. It will be appreciated that the two substrates on which adhesive part A and adhesive part B are pre-applied to do not need to be identical. Preferable at least one of said substrates is wood.

In one embodiment the pre-applied adhesive comprises all vinyl-acetate (co) polymers. Particularly preferred adhesive formulations comprise vinyl acetate containing polyvinyl alcohol colloidal groups. These copolymers are typically synthesized from, but not limited to, vinyl acetate and N-methylol acrylamide (NMA). Other copolymers in the NMA family that can be used to prepare acetate copolymers include N-methylolmethacrylamide (NMMA), N-(alkoxymethyl)-acrylamides, N-(alkoxymethyl)-methacrylamides and esters of N-methylol(meth)acrylamide. The copolymers are typically formulated with a crosslinker for cohesive strength as well as for heat and water resistance. The reactive nature of the functional groups help crosslinking so as to give cohesive strength.

Crosslinkable acetate polymers for use in adhesive component part A include but are not limited to NMA-vinyl acetate copolymer, NMMA vinyl acetate copolymer and NMA-ethylene-vinyl acetate copolymer.

Non-crosslinkable polymers for use in adhesive component part B include but are not limited to vinyl acetate homopolymers and ethylene vinyl acetate copolymer. Both water soluble and non-water soluble polymers are contemplated for use.

The choice of the water-soluble polymers is not critical to the practice of the invention. The presence of the water soluble polymers gives both part A and B adhesives sufficient water remoistenability as to help fast and easy installation and makes a uniform and sealed bond to provide final water resistance. The water soluble polymer is chosen to be amorphous or have a low crystallinity, be compatible with the (co)polymer, and helps slow the film formation process after being pre-applied. Typical water soluble polymers used in the pre-applied systems are poly vinyl alcohol, poly vinyl pyrrolidone, poly acrylamide, and combinations thereof. Other classes are known to be fully compatible but are not widely practiced. These include urea, hydroxy alkyl urea, etc. A preferred water soluble polymer for use in the practice of the invention is polyvinyl alcohol. The polyvinyl alcohol for use in the invention will be at least partially hydrolyzed. Preferably, the degree of hydrolysis degree of hydrolysis will be at most 92% or less, preferably 88% or less. Polyvinyl alcohol is commercially available from Kuraray and others. The ratio of water soluble polymer to acetate (co)polymer will be selected to give the right balance of water remoistenability, water resistance, and final bonding strength.

The use of a crosslinker adds to the cohesive strength and helps in the high temperature performance and water resistance of the adhesives. Typical crosslinkers for use in the practice of the invention include acid catalysts such as aluminum chloride, aluminum nitrate, p-toluene sulfonic acid (p-TSA), sulfamic acid, and combinations thereof. The ratio of crosslinker to acetate polymer is selected to give the right balance of crosslinking strength, and the stability under high temperatures and high humidity environment.

A preferred adhesive component part A of the invention will comprise from about 20 to about 45% by dry weight of a crosslinkable acetate polymer, NMA-vinyl acetate copolymer being particularly preferred, and from about 3% to about 10% by dry weight of a polyvinyl alcohol. Adhesive component part A will typically also comprise a defoamer in amounts of up to about 1% by dry weight, more typically from about 0.1 to about 0.5.

A preferred adhesive component part B of the invention will comprise from about 20 to about 45% by dry weight of a non-crosslinkable acetate polymer, vinyl acetate homopolymer being particularly preferred, from about 3 to about 10% polyvinyl alcohol, and from about 0.5 to about 3% by dry weight of a crosslinker. Adhesive component part B will typically also comprise a defoamer in amounts of up to about 1% by dry weight, more typically from about 0.1 to about 0.5.

The adhesive composition of the invention is useful for bonding articles composed of a wide variety of porous substrates (materials). The adhesive is particularly useful in bonding together substrates in which one or both substrates is made of wood.

The adhesive product can be applied to a substrate by a variety of methods including coating or spraying in an amount sufficient to cause the article to adhere to another substrate upon reactivation. The adhesive formulations (i.e., component parts A and B) of the invention may be pre-applied in a continuous or discontinuous, e.g., as evenly spaced beads or dots, manner depending on surface area and coating weight desired. Particular patterns may be used to optimize substrate/adhesive contact. Depending on the adhesive, the bead size, thickness, distance apart and pattern will vary. The adhesive may be pre-applied to the substrate by any method known in the art, and include, without limitation vacuum coating, slot-coating, swirl spraying, extrusion, contact extrusion, atomized spraying, gravure (pattern wheel transfer) and screen printing. The method of pre-application of the adhesive to the substrate is not critical to the practice of the invention. The adhesive is applied to a substrate while in its liquid state and allowed to dry to harden the adhesive layer. The adhesive can be allowed to air dry or can be dryed by other conventional means, such as with the use of ovens.

The reactivation efficiency, i.e., the ability of the adhesive to become wetted or moistened in a short period of time will depend on the water solubility of the water soluble polymer used. Reactivation time depends on receptivity of the adhesive, which depends on the coating weight or thickness of the adhesive and the amount of water applied. Coating thickness will typically vary from about 0.1 to about 100 mil, more preferably from about 0.5 to about 20 mil.

In the practice of the invention, exposure to moisture is typically for periods of less than about 5 seconds. Pressure is typically applied for periods of less than about 30 seconds. Typically water is used to wet the surfaces. The water may be in the form of a mist, spray or steam. Rather than wet the tongue and groove surfaces of the planks during the installation process, the planks, alternatively be brought together dry, and then the joints wetted, e.g., with a sponge or mop to activate the adhesive.

Adhesive formulations will optionally contain conventional additives including but not limited to fillers including polysaccharide fillers, plasticizers, acids, waxes, synthetic resins, tackifiers, defoamers, preservatives, dyes, pigments, UV indicators, and other additives commonly used in the art.

Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Commercially available preservatives which may be used in the practice of the invention include KATHON LXE sold by Rohm & Haas Company and Nipacide OBS sold by Clariant. The preservative will generally be included in amounts of from 0.05% to about 0.2% by weight.

The adhesive formulations of the invention may be used to bond one substrate to a second similar or different substrate. Preferred are porous substrates, in particular wood. The term "wood" is used broadly to include wood composites and particle board and encompass chipboard, particleboard, medium density fiberboard, high density fiberboard, oriented strandboard, hardboard, hardwood plywood, veneer core plywood, isocyanate or phenolic impregnated strawboard, and wood composites made from wood-fiber and polymers, such as recycled polyethylene.

The pre-applied formulations have shown to be of use in joining one tongue and groove plank to another (e.g. for use in the engineering wood floor markets) and in the furniture market. In particular, besides satisfactory adhesion performance, good water resistance and good aging performance, the invention provides for the shown fast, clean and easy installation for the tongue-in-groove floor joints that are traditionally installed by using wet adhesives.

The invention provides a pre-applied adhesive system that is activated by remoistening with water, yet producing a durable, water-resistant bond., while providing sufficient bond strength and water-resistance.

The adhesive of the invention may be applied to various articles of manufacture and can advantageously be used to bond substrates together.

The invention provides a process of bonding a first substrate to a second substrate wherein said first substrate has preapplied to at least a portion of a surface of said first substrate a first adhesive composition and wherein said second substrate has preapplied to at least a portion of a surface of said second substrate a second adhesive composition, said method comprising contacting said first adhesive present on said first substrate to said second adhesive present on said second substrate thereby bonding said first substrate to the second substrate. In one embodiment the preapplied adhesive on at least one of said first or second substrate is activated by exposure to moisture prior to contacting said first adhesive to said second adhesive. In yet another embodiment, said first adhesive reacts with said second adhesive through a crosslinking reaction.

In a preferred embodiment, the method uses a two component reactive adhesive system. The invention thus provides a process for bonding at least a first substrate to at least a second substrate, wherein at least a portion of at least one of said substrates has applied thereon a first adhesive composition comprising a crosslinkable acetate polymer and a water-soluble polymer and at least a portion of and the second substrate has applied thereon a second adhesive composition comprising a non-crosslinkable acetate polymer, a water soluble polymer and a crosslinking agent, said process comprising exposing the applied first and/or second adhesive to moisture for a time sufficient to moisten the adhesive, bringing one of said substrates in contact with the moistened adhesive on the other substrate, and allowing the adhesive to dry thereby bonding the first substrate to the second substrate.

The invention is further illustrated by the following non-limiting examples. In the examples, the polyvinyl alcohol used had a degree of hydrolysis of 72-76%, the defoamer was Dee Fo 215 and $AlCl_3$ was used as the crosslinking agent

EXAMPLES

Example 1

Representative one part adhesives were prepared by mixing water with the ingredients shown in Table 1. Ingredients are shown in percent by dry weight.

TABLE 1

|  | Sample 1 | Sample 2 |
| --- | --- | --- |
| Water | 56.8 | 58.2 |
| NMA-vinyl acetate copolymer | 17 | 16.1 |
| vinyl acetate homopolymer | 20 | 17 |
| PVOH | 5 | 8 |
| Defoamer | 0.2 | 0.2 |
| Crosslinking agent | 1 | 0.5 |

Example 2

Representative adhesive component parts A and B were prepared by mixing water with the ingredients shown in Table 2 (component part A) and Table 3 (component part B). Ingredients are shown in percent by dry weight.

TABLE 2

|  | Sample 3A | Sample 4A | Sample 5A |
| --- | --- | --- | --- |
| Water | 56.8 | 58.2 | 58.8 |
| NMA-vinyl acetate copolymer | 38 |  |  |
| NMA-ethylene vinyl acetate copolymer |  | 35.6 |  |
| NMMA-vinyl acetate copolymer |  |  | 36 |
| PVOH | 5 | 6 | 5 |
| Defoamer | 0.2 | 0.2 | 0.2 |

TABLE 3

|  | Sample 3B | Sample 4B |
| --- | --- | --- |
| Water | 58.8 | 60.8 |
| Vinyl acetate homopolymer | 34 |  |
| Ethylene vinyl acetate copolymer |  | 31 |
| PVOH | 5 | 6 |
| Defoamer | 0.2 | 0.2 |
| Crosslinker | 2 | 2 |

In the following Examples 3-6, Sample 3A was used as adhesive component part A and Sample 3B was used as adhesive component part B.

Example 3

A ring test was conducted to determine how effectively the joints of preapplied adhesive are sealed against specified liquids. The tongue and groove areas that have been pre-applied with adhesives were rewetted. A joint was prepared by insertion of the tongue fully into the groove. The welded joint was allowed to set for a 24 hour period. The welded laminate joint-piece was placed over an absorbent towel so that any liquid flowing through the joint would be absorbed by the towel. A 3" ID (internal diameter) PVC tube is placed over the joint and a silicon sealant is used to seal the PVC ring onto the laminate joint, the tongue and the groove joint being centered at the center of the ring internal diameter. The PVC ring was then filled with 100 grams of a liquid. The liquid used in this test was a commercially available "Rinse-Free" floor cleaning solution diluted with water to the concentration prescribed by the instructions. The liquid was allowed to stand over the joint for 24 hours. The top the PVC ring was covered with aluminum foil to prevent water evaporation. The time for flow out was noted. The test is over if all the liquid flows out before the prescribed time.

At the end of the 24 hour time period, the liquid still remaining in the ring is poured out into a tared cup and the liquid weighed. The absorbent towel was checked for any absorbed water which may have leaked through the joint. The tube ring was carefully removed from the laminate and the joint checked for any swell/peak with a specially fitted micrometer gauge. Peaking results from swelling of the joint due to absorption of liquid. Results are shown in Table 4.

TABLE 4

| Tongue and Groove type | Leaking Observation | Peaking Observation | Results |
|---|---|---|---|
| 10 mil laminate | No leaking | No peaking | Pass |
| hardwood | No leaking | No peaking | Pass |

Example 4

Tongue and groove areas that have been pre-applied with adhesive were rewetted. At various times following rewetting (immediately following rewetting, 30 sec following rewetting, 1 min following rewetting and 2 min following rewetting), joints were prepared by insertion of the tongue fully into the groove. The welded joints were allowed to set for 5 days at room temperature. Bond strength and % fiber test was tested using a conventional Instron. A twenty-four hour ring test was conducted as described in Example 3. Results are shown in Table 5, which represent the average of at least five samples from each group tested.

TABLE 5

| | Dried at RT for 5 days | | | | |
|---|---|---|---|---|---|
| Remoistening | Avg. Bond | Average | 24 hrs water standing | | |
| time | Strength (pli) | % fiber tear | Leaking | Peaking | Results |
| 0 sec | 90 | 92% | No | No | Pass |
| 30 sec | 123 | 100% | No | No | Pass |
| 1 min | 121 | 100% | No | No | Pass |
| 2 min | 118 | 100% | No | No | Pass |

Example 5

The relentless pull of low forces over long periods of time can lead to joint separation in flooring installations. The following method (creep shear test) is used to test this phenomenon. In the case of a laminate flooring installation, a source of the creep force acting upon a joint is the frictional force between bottom surface of a "loaded" plank and the subsurface upon which the plank is installed. In this test, frictional force is the weight that is hung from a joint made with the adhesive system being evaluated.

A joint was prepared for testing using a tongue and groove area of joint which is ten inches long and three inches on each side of the joint. The pieces were joined with the adhesive or joining system to be evaluated and allowed to "set up" for 24 hours. Using a jig saw one-inch wide samples were cut so that the direction of cut is perpendicular to the joint, and that the joint is one-inch long. A hole was drilled into each tab end so that the hooks can go through. The initial gap separation in the joint was measured with a microscope. The sample was hung from one hook from a horizontal bar. A 1000 gram weight was hung by a hook from the other hole of the sample. At specified intervals, a sample was removed and the gap increase of the joint measured.

Readings of the gap increase of the joint were taken at days 1, 2, 3, 5, 8, 11 and 14. Table 6 shows the increase in gap opening at the prescribed times.

TABLE 6

| Initial | 1 day | 2 day | 3 day | 5 day | 8 day | 11 day | 14 day | Results |
|---|---|---|---|---|---|---|---|---|
| 3.9 mil | 0 mil | 0 mil | 0 mil | 0 mil | 0 mil | 0 mil | 0 mil | No creep |
| 5.9 mil | 0 mil | 0 mil | 0 mil | 0 mil | 0 mil | 0 mil | 0 mil | No creep |
| 4.3 mil | 0 mil | 0 mil | 0 mil | 0 mil | 0 mil | 0 mil | 0 mil | No creep |
| 2.4 mil | 0 mil | 0 mil | 0 mil | 0 mil | 0 mil | 0 mil | 0 mil | No creep |
| 3.9 mil | 0 mil | 0 mil | 0 mil | 0 mil | 0 mil | 0 mil | 0 mil | No creep |

Example 6

Aging tests were conducted to stimulate storage conditions over time and at various temperatures and humidity.

Separate tongue and groove planks having adhesive pre-applied thereto were aged for the time intervals, temperatures and humidity level shown in Tables 7-9. Following appropriate aging, tongue and groove areas that had been pre-applied with adhesive were rewetted and joints prepared immediately following rewetting by insertion of the tongue fully into the groove. The welded joints were allowed to set for 5 days at room temperature. Bond strength and % fiber test was tested using a conventional Instron. Twenty-four hour ring tests were conducted as described in Example 3. Heat stability (Tables 7 and 8) and heat and humidity stability (Table 9) were determined. The data shown the Tables 7-9 represent the average of at least five samples from each group tested.

TABLE 7

| | 110° F. Oven | | | | |
|---|---|---|---|---|---|
| | Avg. Bond | Average | 24 hrs water standing | | |
| Dry time | Strength (pli) | % fiber tear | Leaking | Peaking | Results |
| Two weeks | N/A | N/A | No | No | Pass |
| One Month | 119 | 60% | No | No | Pass |
| Two Month | 127 | 68% | No | No | Pass |

TABLE 8

| | 130° F. Oven | | | | |
|---|---|---|---|---|---|
| | Avg. Bond | Average | 24 hrs water standing | | |
| Dry time | Strength (pli) | % fiber tear | Leaking | Peaking | Results |
| One week | 150 | 53% | No | No | Pass |
| Two week | 125 | 45% | No | No | Pass |

TABLE 9

| | 100° F., 95% RH Oven | | | | |
|---|---|---|---|---|---|
| | Avg. Bond | Average | 24 hrs water standing | | |
| Dry time | Strength (pli) | % fiber tear | Leaking | Peaking | Results |
| One week | 186 | 100% | No | No | Pass |
| Two week | 141 | 100% | No | No | Pass |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A water remoistenable adhesive system which, having been applied to a wood substrate and allowed to dry, is capable, upon reactivation with moisture, of bonding the wood substrate to a second substrate, said adhesive system comprising a two component system wherein a first component comprises a crosslinkable polymer and a water soluble polymer and wherein a second component comprises a water soluble polymer and a crosslinking agent.

2. The adhesive of claim 1 wherein said first component comprises a crosslinkable acetate polymer and a water-soluble polymer and wherein said second component comprises a water soluble polymer and a crosslinking agent.

3. The adhesive of claim 2 wherein the crosslinkable acetate copolymer is a vinyl acetate copolymer.

4. The adhesive of claim 3 wherein the crosslinkable copolymer is N-methylol acrylamide vinyl acetate copolymer.

5. The adhesive of claim 2 wherein said second component further comprises a non-crosslinkable acetate polymer.

6. The adhesive of claim 5 wherein said non-crosslinkable acetate polymer is vinyl acetate homopolymer.

7. The adhesive of claim 5 wherein the non-crosslinkable acetate polymer is a vinyl acetate copolymer.

8. The adhesive of claim 2 wherein the water soluble polymer is a polyvinyl alcohol.

9. The adhesive of claim 6 wherein said first component comprises a N-methylol acrylamide vinyl acetate polymer and polyvinyl alcohol and said second component comprises a vinyl acetate homopolymer, a polyvinyl alcohol and a crosslinking agent.

* * * * *

UNITED STATES PATENT AND TRADEMARK OFFICE
CERTIFICATE OF CORRECTION

PATENT NO.         : 7,235,608 B2
APPLICATION NO. : 10/205137
DATED                 : June 26, 2007
INVENTOR(S)       : Yuhong Hu et al.

It is certified that error appears in the above-identified patent and that said Letters Patent is hereby corrected as shown below:

On title page
delete:

Item (75) Inventors: Yuhong Hu, Belle Mead, NJ (US)
                     Tianijian Huang, Hillsborough, NJ (US)
                     Paul M Petersen, Princeton, NJ (US)

insert:

Item (75) Inventors: Yuhong Hu, Belle Mead, NJ (US)
                     Tianjian Huang, Hillsborough, NJ (US)

Signed and Sealed this

Fourth Day of December, 2007

JON W. DUDAS
*Director of the United States Patent and Trademark Office*